US008225996B2

(12) United States Patent
Asaka (10) Patent No.: US 8,225,996 B2
(45) Date of Patent: Jul. 24, 2012

(54) ELECTRONIC DEVICE, CARD ACCEPTING DEVICE, AND IMAGE HANDLING SYSTEM

(75) Inventor: Hitoshi Asaka, Osaka (JP)

(73) Assignee: Kyocera Mita Corporation (JP)

( * ) Notice: Subject to any disclaimer, the term of this patent is extended or adjusted under 35 U.S.C. 154(b) by 352 days.

(21) Appl. No.: 12/628,374

(22) Filed: Dec. 1, 2009

(65) Prior Publication Data
US 2010/0140350 A1 Jun. 10, 2010

(30) Foreign Application Priority Data
Dec. 8, 2008 (JP) ................................ 2008-312188

(51) Int. Cl.
*G06K 7/01* (2006.01)
(52) U.S. Cl. ...................... 235/382.5; 235/380; 235/382
(58) Field of Classification Search .................. 235/380, 235/382
See application file for complete search history.

(56) References Cited

U.S. PATENT DOCUMENTS 6,619,545 B2 * 9/2003 Harris ........................... 235/381
7,515,038 B2 * 4/2009 Mouri ....................... 340/426.34
2007/0093104 A1 * 4/2007 Mouri ........................... 439/188
2011/0124405 A1 * 5/2011 Okada et al. .................... 463/25

FOREIGN PATENT DOCUMENTS

JP 11039438 A * 2/1999
JP 2002-55567 2/2002

* cited by examiner

*Primary Examiner* — Thien M. Le
*Assistant Examiner* — Christle Marshall
(74) *Attorney, Agent, or Firm* — Gerald E. Hespos; Michael J. Porco (57) ABSTRACT

An electronic device includes: a connection unit for connecting a card accepting device that outputs a card presence signal when the card for using the electronic device has been inserted and ejects the card by at least control with the electronic device; a detection unit that receives the card presence signal and detects that the card has been inserted into the card accepting device; a notification unit that notifies that the card has been inserted into the card accepting device; an operation key; and a control unit for notifying that the card has been inserted into the card accepting device and instructing the card accepting device to eject the card, if it is determined that the detection unit has detected that the card has been inserted into the card accepting device when no operation of the operation key has been accepted within a preset time after a job is completed.

15 Claims, 6 Drawing Sheets

ELECTRONIC DEVICE, CARD ACCEPTING DEVICE, AND IMAGE HANDLING SYSTEM

BACKGROUND OF THE INVENTION

1. Field of the Invention

The present invention relates to an electronic device, a card accepting device, and an image handling system.

2. Description of the Related Art

An image forming device that forms images, such as an all-in-one machine, a copier, and a printer is installed in a store such as a convenience store and provides services (copy services) that enable a customer to use the image forming device. A card accepting device that accepts the insertion of a card via a signal line is connected to the image forming device of this type. The image forming device assumes a state in which it can be used when the card accepting device accepts the inserted user's card.

Where a facsimile machine connected to the card accepting device is also provided in the store and the customer inserts a card in the card accepting device, then FAX services are provided that enable the customer to use the facsimile machine.

Such an electronic device assumes a state in which it can be used when the card accepting device accepts the inserted card. Therefore, by contrast with a state in which an electronic device is used without connection to the card accepting device, the following specific problems can be encountered.

For example, after a user has inserted a card into a card accepting device to make the device usable and has conducted a job such as copying, the user sometimes leaves the location where the electronic device is disposed without removing the card from the card accepting device. The electronic device is in a usable state as long as the card is inside the card accepting device. In other words, as long as the card is inside the card accepting device, the electronic device is in a stand-by state for job execution and the job can be executed by operating a key. In this case, another person can erroneously use the electronic device.

In particular, in a case where the electronic device is disposed in a store, when a user leaves the location where the electronic device is disposed, while the card is still inserted into the card accepting device, there is a high probability that the electronic device will be used by an ill-willed another person.

Further, as long as the card is inserted into a card accepting device, the card inserted into the card accepting device hinders the execution of an energy saving mode. Therefore, if the user forgets to remove the card, the energy saving mode cannot be executed in the electronic device. In such a state, although the electronic device is actually not used, power consumption cannot be reduced.

SUMMARY OF THE INVENTION

It is an object of the present invention to present a user with an adequate opportunity to take out the card after the card has been inserted into the card accepting device and the job of using the electronic device has been executed.

An electronic device according to one aspect of the present invention that attains the above-described object comprises: a connection unit serving for connection of a card accepting device that outputs a card presence signal indicating that a card is inserted when the card in which user information necessary to use the electronic device is recorded has been inserted and ejects the card by an operation of a special operation key or control with the electronic device; a detection unit that receives via the connection unit the card presence signal outputted from the card accepting device and detects that the card has been inserted into the card accepting device; a notification unit that notifies that the card has been inserted into the card accepting device; an operation key; and a control unit that receives an operation of the operation key and executes a job of handling an image data, wherein the control unit executes a card insertion determination processing of determining whether the detection unit has detected that the card has been inserted into the card accepting device when the operation of the operation key is not received within a preset time after the job is completed, and executes a card insertion notification processing of notifying with the notification unit that the card has been inserted into the card accepting device and a card ejection instruction processing of instructing the card accepting device to eject the card when it is determined that the detection unit has detected that the card has been inserted into the card accepting device.

DETAILED DESCRIPTION OF THE PREFERRED EMBODIMENTS

Figure 1:
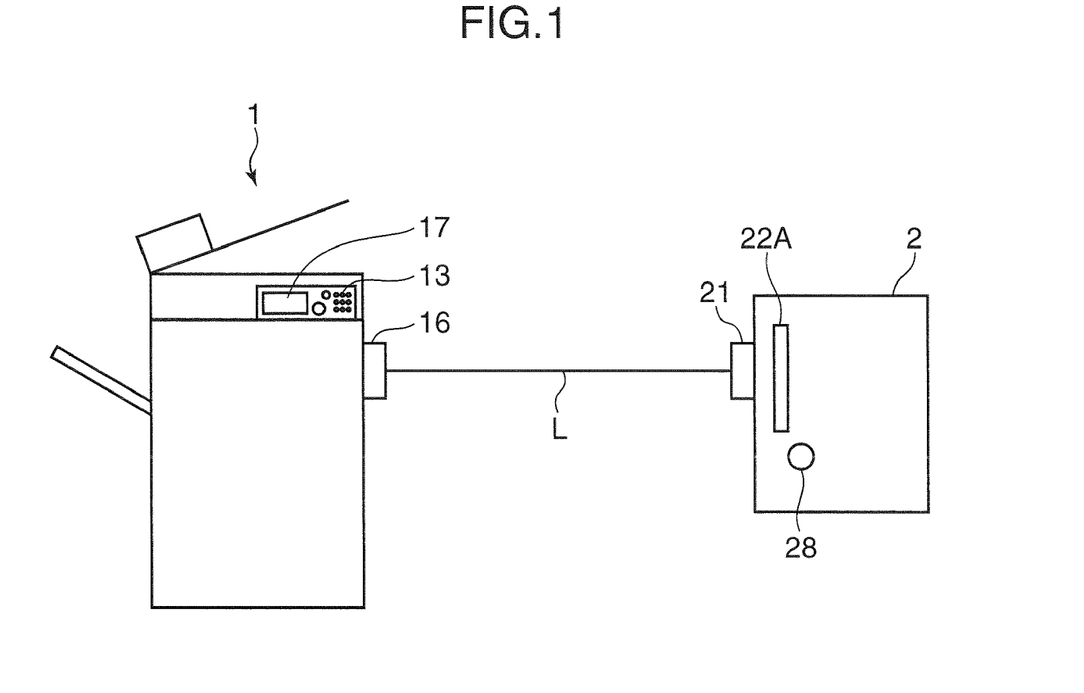
FIG. 1 is a perspective view illustrating schematically an example of image handling system of one embodiment of the present invention.
Figure 2:
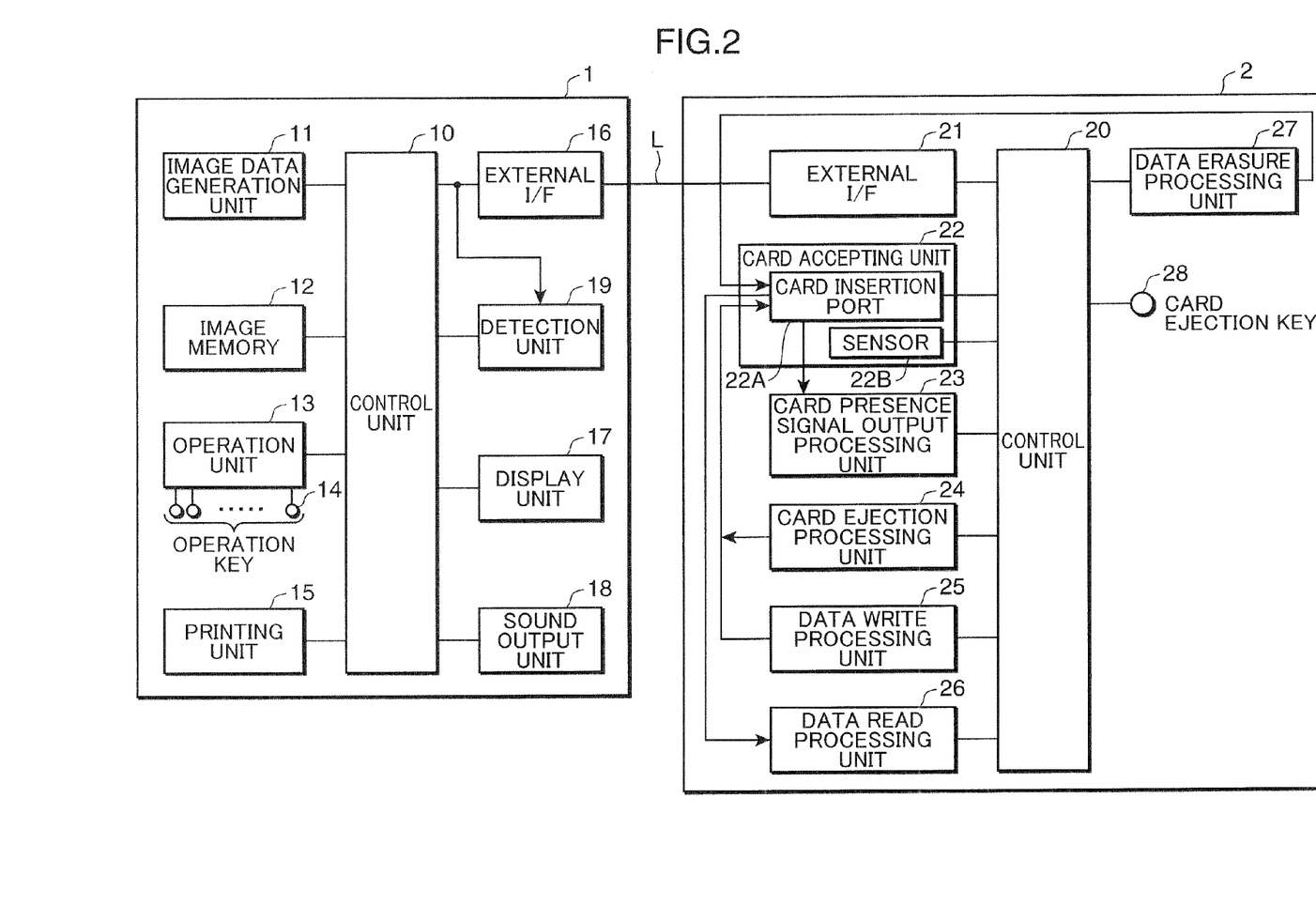
FIG. 2 is a block diagram illustrating a functional configuration example of an electronic device and a card accepting device of one embodiment of the present invention.

An electronic device, a card accepting device, and an image handling system of one embodiment of the present invention will be explained below. FIG. 1 is a perspective view illustrating schematically an example of the image handling system of one embodiment of the present invention. FIG. 2 is a block diagram illustrating a functional configuration example of the electronic device and card accepting device of one embodiment of the present invention.

In the explanation below, the electronic device is a general name for an all-in-one device, a copier, and a facsimile machine that can handle images. FIG. 1 and FIG. 2 show a copier, which is an example of the electronic device.

In the image handling system shown in FIG. 1, a signal line L suitable for bidirectional communication is connected to an external I/F (interface) (connection unit) 16 of an electronic device 1 and an external I/F 21 of a card accepting device 2. Examples of the signal line L include a serial cable and a parallel cable.

The card accepting device 2 is provided with a card insertion port 22A for accepting the insertion of a card. The card inserted into the card insertion port 22A is a card in which usage information for using the electronic device 1 is recorded. The card is for example a special card having a remaining balance recorded thereon, a cash card having a password recorded thereon, or a credit card.

The electronic device 1 shown in FIG. 2 is provided with a control unit 10, an image data generation unit 11, an image memory 12, an operation unit 13, a printing unit 15, an external I/F (connection unit) 16, a display unit (notification unit) 17, a sound output unit (notification unit) 18, and a detection unit 19.

In the electronic device 1, the control unit 10 controls the electronic device 1 by transferring control signals and data via a control bus (for example, a CPU bus) and a data bus and executes the below-described processing of various types. The processing of various types includes a card insertion determination processing, a card insertion notification processing, a card ejection instruction processing, a usage inhibition data read instruction processing, a usage prohibition data determination processing, a job execution prohibition processing, a usage prohibition notification processing, a usage prohibition data erasure instruction processing, a recognition data input reception processing, and a recognition data verification processing.

Further, the control unit 10 is provided with a timer (not shown in the figure) for measuring the preset time $\Delta T$ in the below-described processing.

The image data generation unit 11 scans an original placed on an original table (not shown in the figure) and creates image data. The image memory 12 stores the image data created by the image data generation unit 11. The operation unit 13 is provided with one or a plurality of operation keys 14 . . . . The printing unit 15 forms a toner image representing the image data on the recording paper that has been preset and then fixes the toner image formed on the recording paper to the recording paper by heating and applying a pressure.

The external I/F 16 executes the exchange of the below-described signals with the card accepting device 2 via the signal line L. The display unit 17 displays various images. The sound output unit 18 outputs various sounds.

The card accepting device 2 shown in FIG. 2 is provided with a control unit 20, an external I/F 21, a card accepting unit 22, a card presence signal output processing unit 23, a card ejection processing unit 24, a data write processing unit 25, a data read processing unit 26, a data erasure processing unit 27 and a card ejection key (special operation key) 28 that is operated to eject the card that has been inserted into the card insertion port 22A.

In such a card accepting device 2, the control unit 20 controls the card accepting device 2 by transferring control signals and data via a control bus (for example a CPU bus) and a data bus. Further, the control unit 20 executes the below-described processing of various types. The processing of various types executed by the control unit 20 includes a card presence signal output processing, a card ejection processing, a usage inhibition data write processing, and a usage prohibition data erasure processing.

The external I/F 21 exchanges the below-described signals with the electronic device 1 via the signal line L. The card accepting unit 22 is provided with a card insertion port 22A that accepts the card insertion. Further, the card accepting unit 22 is provided with a sensor 22B that detects the insertion of the card. The sensor 22B notifies the control unit 20 that the card has been inserted when the insertion of the card has been detected. The control unit 20 instructs the card presence signal output processing unit 23 to output a card presence signal when the control unit 20 is notified from the sensor 22B that the card has been inserted.

The card presence signal output processing unit 23 outputs the card presence signal to the electronic device 1 via the external I/F 21 in response to the instruction from the control unit 20. The card ejection processing unit 24 is provided with a card ejection mechanism (not shown in the figure) and ejects the card inserted into the card insertion port 22A in response to the instruction from the control unit 20. The card ejection mechanism is configured by, for example, a motor and a conveying roller that is rotated by the motor.

Further, the card ejection processing unit 24 also ejects the card inserted into the card insertion port 22A when the card ejection key 28 is operated.

The data write processing unit 25 is provided with a magnetic writer (not shown in the figure) and writes data to the card inserted into the card insertion port 22A in response to the instruction from the control unit 20. The data read processing unit 26 is provided with a magnetic reader (not shown in the figure) and reads the data that have been recorded on the card inserted into the card insertion port 22A in response to the instruction from the control unit 20. The data erasure processing unit 27 is provided with an erasing head (not shown in the figure) and erases the data that have been recorded on the card inserted into the card insertion port 22A in response to the instruction from the control unit 20.

The above-described image handling system executes the following basic operations. Thus, if the card is inserted into the card insertion port 22A of the card accepting device 2, the electronic device 1 assumes a state in which it can be used. The state in which the electronic device 1 can be used, as referred to herein, means a standby state for executing a job in which a job can be executed if the operation key 14 is operated. When the copy job execution is requested in the electronic device 1, the image data generation unit 11 successively creates image data of the original.

The successively created image data are successively stored in the image memory 12, and the image data that have been stored in the memory 12 are printed in the printing unit 15. In the printing unit 15, a toner image representing the image data is formed on a preset recording paper, and the toner image formed on the recording paper is thereafter fixed to the recording paper by heating and applying a pressure. By such operations, the image of the original is copied onto the recording paper.

Figure 3:
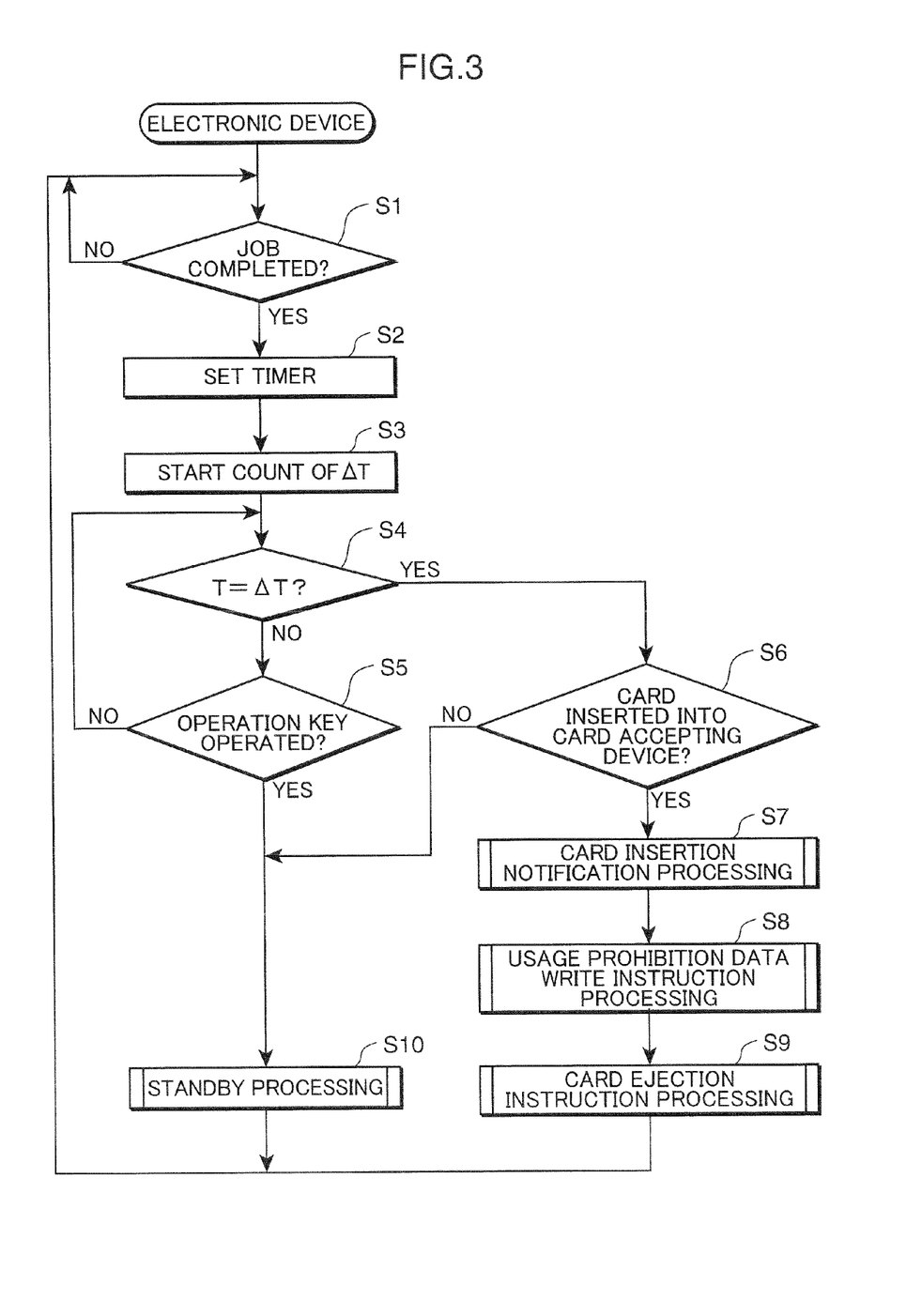
FIG. 3 is a flowchart illustrating an example of processing executed by the electronic device when the user forgets to remove the card from the card accepting device after the job is completed.

FIG. 3 is a flowchart illustrating an example of processing executed by the electronic device 1 when the user forgets to remove the card from the card accepting device 2 after the job is completed. Thus, when the execution of a job in the electronic device 1 is completed (YES in step S1), the control unit 10 sets a timer (not shown in the figure) (step S2) and starts counting the preset time $\Delta T$ (step S3).

Then, the control unit 10 determines (step S5) whether an operation of the operation key 14 has been accepted before the count of the preset time $\Delta T$ is completed (NO in step S4). When it is determined that the operation of the operation key 14 has not been accepted before the count of the time $\Delta T$ is completed, that is, that the operation of the operation key 14 has not been accepted after the job has been completed and before the time $\Delta T$ has elapsed, the control unit 10 determines whether the card has been inserted into the card accepting device 2 (step S6).

In other words, the control unit 10 determines whether the detection unit 19 has detected the insertion of the card into the card accepting device 2. When the card has been inserted into the card accepting device 2 (YES in step S6), the control unit 10 executes the card insertion notification processing (step S7).

The card insertion notification processing is a processing in which the user is notified that the card has been inserted into the card accepting device 2 by the display unit 17 or sound output unit 18. Examples of such processing include a processing of displaying a message screen "PLEASE, REMOVE THE CARD" in the display unit 17 and a processing of lighting up or blinking a light-emitting diode (not shown in the figure) in the display unit 17. Other examples of such processing include a processing of outputting an alarm message "PLEASE, REMOVE THE CARD" in the sound output unit 18 and a processing of outputting an alarm sound.

Thus, the card insertion notification processing is executed in the electronic device 1 when the operation key 14 is not operated before the time ΔT elapses after the job is completed. Because the user can thus easily determine that the card is not ejected, the user can conduct the card ejection operation at this time (operation of the card ejection key 28). Because the user can thus conduct the card ejection operation (operation of the card ejection key 28) based on the results of the card insertion notification processing, the user can be easily prevented from forgetting to eject the card from the card accepting device 2 after the job execution with the electronic device 1.

Further, when the card ejection operation (operation of the card ejection key 28) is not executed even when the card has been inserted into the card accepting device 2 (YES in step S6) and the card insertion notification processing (step S7) has been executed, the control unit 10 executes the usage prohibition data write instruction processing (step S8). In the usage prohibition data write instruction processing, a signal is outputted that instructs the card accepting device 2 to write usage prohibition data for prohibiting the use of the electronic device 1 on the card that has been inserted into the card insertion port 22A. In the card accepting device 2 that has received the signal, a processing of writing the usage prohibition data on the card inserted into the card insertion port 22A is executed.

Further, in a state in which the card is inserted into the card accepting device 2 (YES in step S6), the control unit 10 executes the card ejection instruction processing (step S9) after the card insertion notification processing (step S7) and usage prohibition data write instruction processing (step S8) have been executed. In the card ejection instruction processing, a signal is outputted that instructs the card accepting device 2 to eject the card that has been inserted into the card insertion port 22A. In the card accepting device 2 that has received the signal, the processing of ejecting the card inserted into the card insertion port 22A is executed.

When the operation of the operation key 14 has been received before the time ΔT elapses after the completion of the job (NO in step S4, YES in step S5) the control unit 10 executes the standby processing (step S10). In the standby processing, the temperature of a fixing roller (not shown in the figure) in the printing unit 15 is held at a standby temperature that is lower than the toner image fixing temperature at which the toner image formed on the recording paper is fixed and that can be easily risen to the toner image fixing temperature and the system waits for a request to execute the job.

Further, the control unit 10 also executes the above-described standby processing (step S10) when the card is not inserted into the card accepting device 2 at a point in time in which the time ΔT elapses since the completion of the job (NO in step S6).

Figure 4:
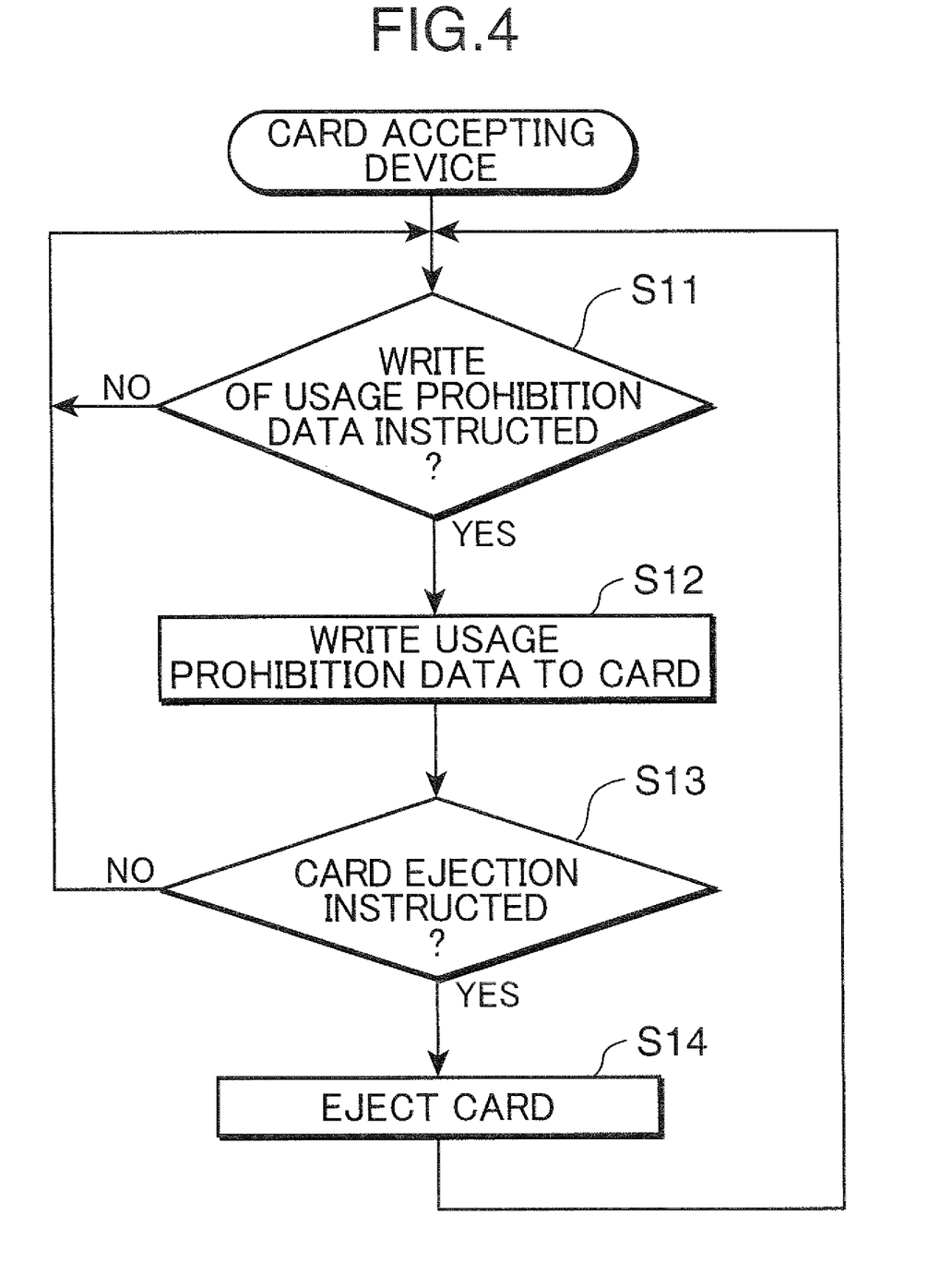
FIG. 4 is a flowchart illustrating an example of processing executed by the card accepting device when the user forgets to remove the card from the card accepting device within a predetermined time after the job is completed.

FIG. 4 is a flowchart illustrating an example of processing executed by the card accepting device 2 when the usage prohibition data writing instruction processing and card ejection instruction processing by the electronic device 1 are accepted. Thus, when the card accepting device 2 receives a signal that is outputted by the usage prohibition data writing instruction processing executed by the electronic device 1 (step S8 in FIG. 3) and instructs writing the usage prohibition data for prohibiting the use of the electronic device 1 to the card that has been inserted into the card insertion port 22A (YES in step S11), the control unit 20 writes with the data write processing unit 25 the usage prohibition data to the card inserted into the card insertion port 22A (step S12).

When the card accepting device 2 receives the signal that is outputted by the card ejection instruction processing (step S9 in FIG. 3) executed by the electronic device 1 and that instructs the ejection of the card inserted into the card insertion port 22A (YES in step S13), the control unit 20 ejects with the card ejection processing unit 24 the card inserted into the card injection port 22A (step S14).

As shown in FIG. 3 and FIG. 4, with such a configuration, the card insertion determination processing is executed when the time in which the operation key 14 is not operated after the completion of the job is the preset time ΔT. Where the results of the processing indicate that the card has been inserted into the card accepting device 2, the card insertion notification processing and card ejection instruction processing are executed.

Therefore, the card insertion notification processing is executed when a state is sustained in which the card is not ejected for a preset time after the user has inserted the card into the card accepting device 2 and the job has been executed by the electronic device 1. Therefore, the user can easily determine that the card is not ejected at this point in time.

As a result, the user can receive the result of the card insertion notification processing and conduct the operation of ejecting the card with the special operation key. Therefore, the user can be easily prevented from forgetting to eject the card from the card accepting device 2 after the job has been executed by the electronic device 1.

In a case where the card is not ejected from the card accepting device 2 even after the card insertion notification processing has been executed, the usage prohibition data writing instruction processing is executed. Thus, the card onto which the usage prohibition data have been written is made impossible to use.

As a result, in a case where the user forgets to conduct the card ejection operation with the special operation key even when the results of the card insertion notification processing are received, the card is made impossible to use in the electronic device 1. Therefore, the improper use of the card by another person who got hold of the card can be easily prevented.

Further, because the card inserted into the card accepting device 2 can be forcibly ejected, while the card insertion notification processing is being executed, the user can easily determine the state in which the card can be returned and therefore the opportunity for returning the card is adequately ensured.

Figure 5:
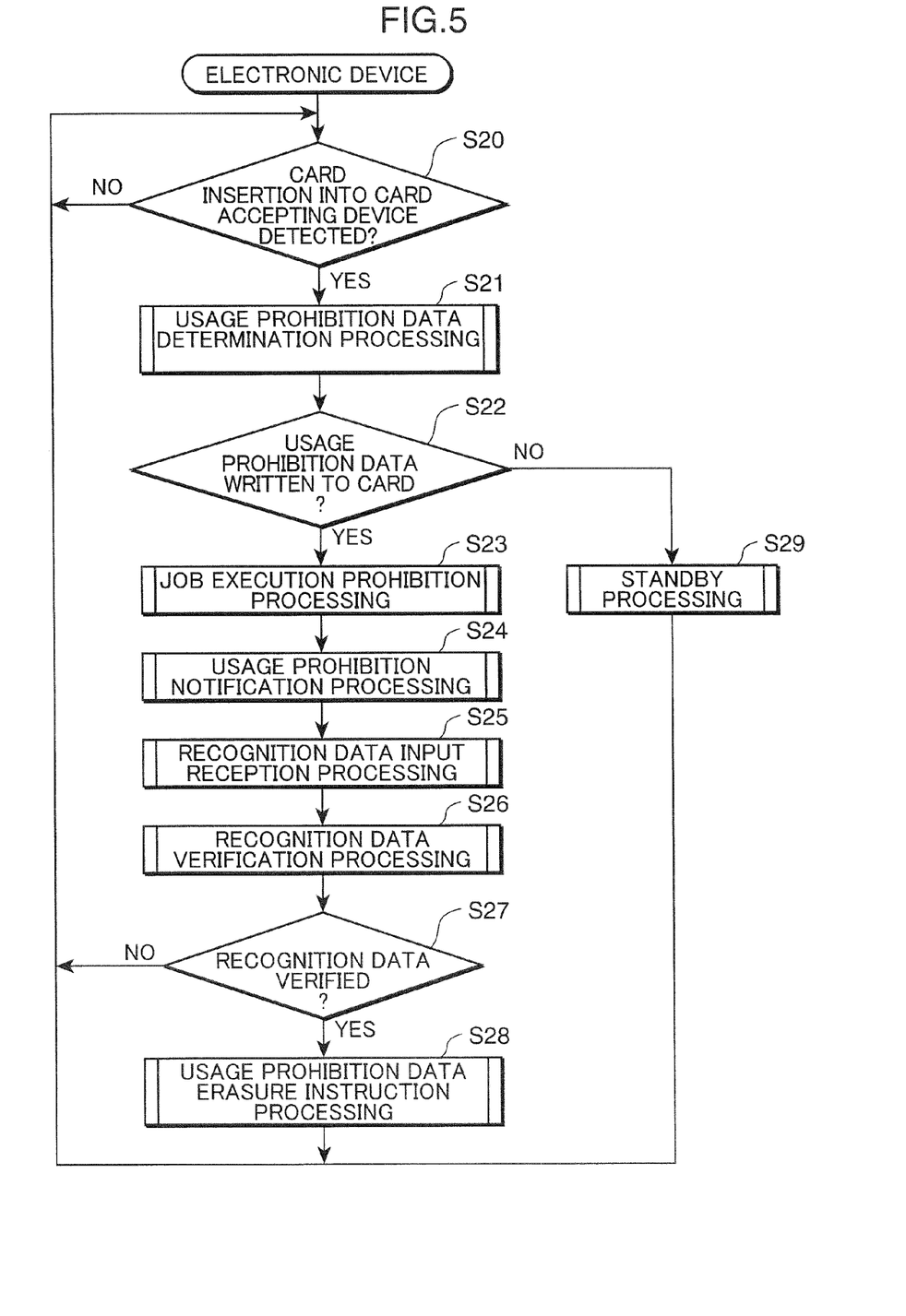
FIG. 5 is a flowchart illustrating an example of processing executed by the electronic device when a card is used that has usage prohibition data written thereto.

FIG. 5 is a flowchart illustrating an example of processing executed by the electronic device 1 when a card is used that has usage prohibition data written thereto. When the detection unit 19 detects that the card has been inserted into the card accepting device 2 (step S20), the control unit 10 executes the usage prohibition data determination processing (step S21).

The usage prohibition data determination processing is executed by determining whether the usage prohibition data for prohibiting the use of the electronic device 1 are contained in the data that have been read out by the card accepting device 2 and outputted and determining whether the usage prohibition data have been written to the card.

When the processing results in determining that the usage prohibition data have been written to the card (YES in step S22), the control unit 10 performs the job execution prohibition processing (step S23). The job execution prohibition processing prohibits the execution of the job that received the operation of the operation key 14.

Thus, job execution is prohibited when the usage prohibition data are written to the card inserted into the card accepting device. Therefore, even if the user forgets to return the card after the job is completed, the card is easily prevented from being used by another person.

When it is determined that the usage prohibition data have been written to the card (YES in step S22), the control unit 10 executes the usage prohibition notification processing (step S24). The usage prohibition notification processing causes the display unit 17 or sound output unit 18 to notify that the use of the electronic device 1 is prohibited.

Examples of such processing include a processing of displaying a message screen of "This Card Cannot Be Used" at the display unit 17 or a processing of lighting up or blinking a light-emitting diode (not shown in the figure) in the display unit 17. Other examples of such processing include a processing of outputting an announcement message of "This Card Cannot Be Used" in the sound output unit 18 and a processing of outputting an alarm sound.

Thus, when the usage prohibition data are written to the card, the usage prohibition notification processing is executed. Therefore, even if another person erroneously inserts the card into the card accepting device, because it is easily determined that the use of the card is prohibited, the other person easily determines that the card is used erroneously.

Further, when it is determined that the usage prohibition data are written to the card (YES in step S22), the control unit 10 successively executes the recognition data input reception processing (step S25) and recognition data verification processing (step S26). When the recognition data are verified (YES in step S27), the usage prohibition data erasure instruction processing is executed (step S28).

The recognition data input reception processing is a processing of receiving an input of recognition data for erasing the usage prohibition data written to the card. For example, in this processing, the display unit 17 is caused to display the password input screen, the operation of the operation key 14 is accepted, and the input of the password (recognition data) is received.

Further, the recognition data verification processing is a processing of verifying the inputted password. The recognition data verification processing is, for example, a processing in which the control unit 10 of the electronic device 1 compares the password inputted by the operation of the operation key 14 with the password that has been stored in advance in the card.

As a pre-processing for executing such processing, for example, the password inputted by the operation of the operation key 14 is outputted to the card accepting device 2, and the card accepting device 2 is caused to write the password to the card inserted into the card accepting device 2. In this case, the card accepting device 2 writes the password received from the electronic device 1 to the card with a data write processing unit 25.

Where the passwords is thus written in advance to the card, the electronic device 1 and card accepting device 2 can execute the following processing.

Thus, the electronic device 1 requests the card accepting device 2 to output the password written to the card. As a result, the card accepting device 2 reads the password written to the card with the data read processing unit 26 under control with the electronic device 1 and outputs the password that has been read out to the electronic device 1 via the external interface 21. The data read processing unit 26, control unit 20, and external interface 21 constitute the data read output unit.

As a result, the electronic device 1 can compare the password that was inputted by the operation of the operation key 14 and the password that was recorded in advance to the card.

A processing can be also executed by which the inputted password is compared with a password that has been stored in advance in a memory (not shown in the figure) in the electronic device 1 and it is verified whether two passwords match.

The recognition data verification processing can be also a processing in which a verification instruction is issued from the electronic device 1 to the card accepting device 2, the password outputted from the electronic device 1 is compared with the password written to the card in the card accepting device 2, and the verification result is outputted to the electronic device 1. Further, the recognition data verification processing and the below-described usage prohibition data erasure processing can be also executed in the card accepting device 2, and the card accepting device 2 can erase the usage prohibition data from the card in response to the recognition data verification results.

Thus, the usage prohibition data erasure instruction processing is executed by the control unit 10 after the recognition data inputted in the recognition data input reception processing have been verified by recognition data verification processing. As a result, only the appropriate card owner can erase the usage prohibition data written to the card. Therefore, the usage prohibition data is effectively prevented from being erased by another person.

The usage prohibition data erasure processing may be also a processing of inputting an administrator password that has been set in advance, displaying a predetermined administrator message on the display unit 17, and executing the usage prohibition data erasure processing by administrator's operation when the inputted administrator password is verified.

Further, in the usage prohibition data erasure instruction processing, a signal that causes to erase the usage prohibition data written to the card is outputted to the card accepting device 2. The usage prohibition data erasure processing is executed in the card accepting device 2 that has received the signal.

Meanwhile, where the usage prohibition data are not determined to have been written to the card (NO in step S22), the above-described standby processing is executed (step S29).

Figure 6:
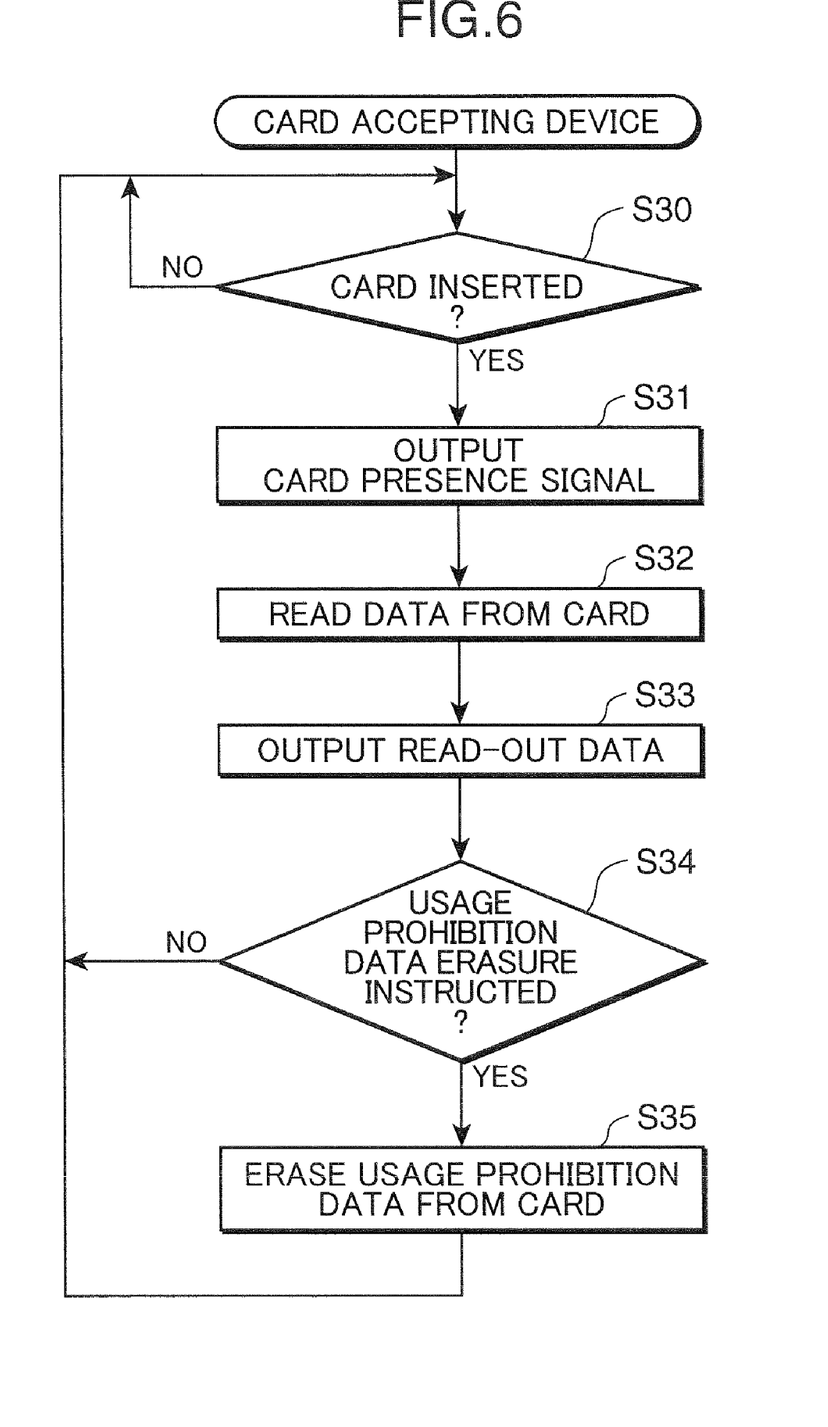
FIG. 6 is a flowchart illustrating an example of processing executed by the card accepting device when a card is used that has usage prohibition data written thereto.

FIG. 6 is a flowchart illustrating an example of processing executed by the card accepting device 2 when a card is used that has usage prohibition data written thereto. Thus, when the card is inserted into the card accepting device 2 (step S30), the insertion of the card is detected by the sensor 22B. The control unit 20 outputs the card presence signal to the electronic device 1 by the card presence signal output processing unit 23 (step S31).

Then, the control unit 20 causes the data read processing unit 26 to read the data recorded on the card (step S32) and outputs the data to the electronic device 1 (step S33). When a signal is received that is outputted by the usage prohibition data erasure instruction processing executed by the electronic device 1 and requires the usage prohibition data written to the card to be erased (YES in step S34), the data erasure processing unit 27 erases the usage prohibition data written to the card (step S35).

Thus, when the card accepting device 2 receives a signal that requires the usage prohibition data written to the card to be erased, the usage prohibition data are erased from the card. As a result, even in the case where the user forgot to take out the card ejected from the card accepting device 2 and the use of the card was prohibited, the user still can make the card usable again by erasing the usage prohibition data written to the card.

The electronic device according to one aspect of the present invention comprises: a connection unit serving for connection of a card accepting device that outputs a card presence signal indicating that a card is inserted when the card in which user information necessary to use the electronic device is recorded has been inserted and ejects the card by an operation of a special operation key or control with the electronic device; a detection unit that receives via the connection unit the card presence signal outputted from the card accepting device and detects that the card has been inserted into the card accepting device; a notification unit that notifies that the card has been inserted into the card accepting device; an operation key; and a control unit that receives an operation of the operation key and executes a job of handling an image data, wherein the control unit executes a card insertion determination processing of determining whether the detection unit has detected that the card has been inserted into the card accepting device when the operation of the operation key is not received within a preset time after the job is completed, and executes a card insertion notification processing of notifying with the notification unit that the card has been inserted into the card accepting device and a card ejection instruction processing of instructing the card accepting device to eject the card when it is determined that the detection unit has detected that the card has been inserted into the card accepting device.

With such a configuration, the card insertion determination processing is executed when the operation of the operation key is not received within a preset time after the job is completed. Where the results of the processing indicate that the card has been inserted into the card accepting device, the card insertion notification processing and card ejection instruction processing are executed.

Therefore, the card insertion notification processing is executed when a state is sustained in which the card is not ejected for a preset time after the user has inserted the card into the card accepting device and the job has been executed by the electronic device. Therefore, the user can easily determine that the card is not ejected at this point in time.

As a result, the user can receive the result of the card insertion notification processing and conduct the operation of ejecting the card with the special operation key. Therefore, the user can be easily prevented from forgetting to eject the card from the card accepting device after the job has been executed by the electronic device.

Further, because the card inserted into the card accepting device can be forcibly ejected, while the card insertion notification processing is being executed, the user can easily determine the state in which the card can be returned and therefore the opportunity for returning the card is adequately ensured.

Furthermore, because the card is ejected when the operation of the operation key is not conducted within a preset time after the job is completed, the factors preventing the electronic device from executing an energy saving mode are removed.

In the above-described configuration, it is preferred that the card accepting device that writes data to the card under the control with the electronic device be connected to the connection unit, and that the control unit execute a usage prohibition data write instruction processing of writing usage prohibition data for prohibiting the use of the electronic device to the card with the card accepting device when it is determined based on the results of executing the card insertion determination processing that the detection unit has detected that the card has been inserted into the card accepting device.

With such a configuration, the usage prohibition data write indication processing is executed where the results of the card insertion determination processing indicate that the card has been inserted into the card accepting device. Thus, the card onto which the usage prohibition data have been written cannot be used.

As a result, even if the user forgets to take out his or her own card, this card cannot be used in the electronic device. Therefore, the card can be easily prevented from being used by another person.

In the above-described configuration, it is preferred that the card accepting device that reads data written to the card and outputs the read-out data under the control with the electronic device be connected to the connection unit, and that the control unit execute a usage prohibition data determination processing of determining whether usage prohibition data for prohibiting the use of the electronic device are contained in the data that have been read and outputted from the card accepting device and determining whether the usage prohibition data have been written to the card, and execute a job execution prohibition processing of prohibiting the execution of the job when the control unit determines that the usage prohibition data have been written to the card.

With such a configuration, the execution of the job is prohibited when the usage prohibition data have been written to the card inserted into the card accepting device. Therefore, the card is easily prevented from being used by another person.

In the above-described configuration, it is preferred that the control unit executes a usage prohibition notification processing of notifying with the notification unit that the use of the electronic device is prohibited when executing the job execution prohibition processing.

With such a configuration, the usage prohibition notification processing is executed by the electronic device when another person inserts into the card accepting device a card with the usage prohibition data written thereto. As a result, another person who erroneously inserted the card into the card accepting device can easily determine that the use of the card is prohibited. Therefore, the other person can be easily prevented from erroneously inserting the card into the card accepting device and causing the electronic device to execute the job.

In the above-described configuration, it is preferred that the card accepting device that erases data written to the card under the control with the electronic device be connected to the control unit, and that the control unit execute a usage prohibition data erasure instruction processing of erasing, with the card accepting device, usage prohibition data for prohibiting the use of the electronic device that have been written to the card.

With such a configuration, the usage prohibition data written to the card are erased by the card accepting device that has been controlled by the electronic device. As a result, even though the card usage is prohibited, the user who reacquired the card can again return the card to the usable state by erasing the usage prohibition data written to the card.

In the above-described configuration, it is preferred that the control unit execute the usage prohibition data erasure instruction processing after executing a recognition data input reception processing of receiving an input of recognition data for erasing the usage prohibition data written to the card and a recognition data verification processing of verifying the inputted recognition data.

With such a configuration, the usage prohibition data erasure instruction processing is executed after the recognition data inputted in the recognition data input receiving processing have been verified by the recognition data verification processing. As a result, only the appropriate card owner can erase the usage prohibition data written to the card. Therefore, the usage prohibition data is effectively prevented from being erased by another person.

In the above-described configuration, it is preferred that the connection unit be connected to the card accepting device that is further provided with a data write processing unit that receives the recognition data from the electronic device and writes the recognition data to the card under the control with the electronic device, and a data read output unit that reads and outputs the recognition data written to the card under the control with the electronic device, and that the control unit executes a recognition data write instruction processing of outputting the recognition data inputted by the operation of the operation key to the card accepting device, thereby writing the recognition data to the card, and cause the card accepting device to output the recognition data written to the card and receive the recognition data as the recognition data input reception processing.

With such a configuration, where recognition data are inputted by the operation of the operation key to the electronic device, the recognition data are outputted to the card accepting device. The recognition data outputted to the card accepting device are written by the card accepting device to the card inserted into the card accepting device.

The recognition data thus written to the card by the card accepting device are read and outputted to the electronic device under the control with the electronic device and used for the recognition data verification processing in the electronic device.

The recognition data input reception processing and recognition data verification processing are thus specifically realized in the electronic device.

A card accepting device according to another aspect of the invention comprises: a card presence signal output processing unit that outputs, to an electronic device, a card presence signal indicating that a card is inserted when the card in which user information necessary to use the electronic device is recorded has been inserted; and a card ejection processing unit that ejects the card by an operation of a special operation key or control with the electronic device.

With such a configuration, a card presence signal indicating that a card has been inserted when the card in which user information necessary to use the electronic device is recorded has been inserted is outputted to the electronic device. Further, the card inserted into the card accepting device is ejected by an operation of a special operation key or control with the electronic device.

As a result, the following effect is demonstrated when the card accepting device is used in combination with the below-described electronic device.

The electronic device as referred to herein is an electronic device that executes a card insertion notification processing of notifying that the card has been inserted into the card accepting device and a card ejection instruction processing of instructing the card accepting device to eject the card when a card presence signal outputted from the card accepting device is detected, while a state without receiving an operation of the operation key is maintained for a preset time after the job is completed.

Thus, the electronic device executes the card insertion determination processing when the operation of the operation key is not conducted within a preset time after the job is completed. Where the electronic device detects that the card have been inserted into the card accepting device based on the processing result, the card insertion notification processing and card ejection instruction processing are executed.

Therefore, the card insertion notification processing is executed when a state is sustained in which the card is not ejected for a preset time after the user has inserted the card into the card accepting device and the job has been executed by the electronic device. Therefore, the user can easily determine that the card is not ejected at this point in time.

As a result, the user can receive the result of card insertion notification processing and conduct the card ejection operation with the special key. Therefore, the user can be easily prevented from forgetting to eject the card from the card accepting device after the job has been executed by the electronic device.

In addition, because the card inserted into the card accepting device can be forcibly ejected, while the card insertion notification processing is being executed, the user can easily determine the state in which the card can be taken out and therefore the opportunity for taking out the card is adequately ensured.

Furthermore, because the card is ejected when the operation of the operation key is not conducted within a preset time after the job is completed, the factors preventing the electronic device from executing an energy saving mode are removed.

In the above-described configuration, it is preferred that a usage prohibition data write processing unit that writes usage prohibition data for prohibiting the use of the electronic device to the card under the control with the electronic device be further provided.

With such a configuration, it is possible to execute the usage prohibition data write processing of writing usage prohibition data for prohibiting the use of the electronic device to the card that has been inserted into the card accepting device under the control with the electronic device. Thus, the card onto which the usage prohibition data have been written cannot be used.

As a result, even if the user forgets to take out his or her own card, this card cannot be used in the electronic device. Therefore, the card can be easily prevented from being used by another person.

The above-described configuration is preferably further provided with a usage prohibition data erasure processing unit that erases the usage prohibition data written to the card under the control with the electronic device.

With such a configuration, the usage prohibition data written to the card are erased by the card accepting device that has been controlled by the electronic device. As a result, even though the card usage is prohibited, the user who reacquired the card can again return the card to the usable state by erasing the usage prohibition data written to the card.

The above-described configuration is preferably further provided with a data write processing unit that receives a recognition data for erasing a usage prohibition data written to the card from the electronic device and writes the recognition data to the card under the control with the electronic device, and a data read output unit that reads and outputs the recognition data written to the card under the control with the electronic device.

With such a configuration, the data write processing unit receives the recognition data from the electronic device and writes the recognition data to the card under the control with the electronic device. Thus, the recognition data written to the card are read from the card and outputted to the electronic device under the control with the electronic device.

The recognition data input reception processing and recognition data verification processing are thus specifically realized in the electronic device.

An image handling system according to another aspect of the present invention comprises: a card accepting device that outputs a card presence signal indicating that a card is inserted when the card in which user information necessary to use the electronic device is recorded has been inserted and ejects the card by an operation of a special operation key or control with the electronic device; and an electronic device including: a connection unit serving for connection of the card accepting device that can insert and eject the card in which user information necessary to use the electronic device is recorded and that outputs a card presence signal indicating that the card has been inserted; a detection unit that receives via the connection unit the card presence signal outputted from the card accepting device and detects that the card has been inserted into the card accepting device; a notification unit that notifies that the card has been inserted into the card accepting device; an operation key; and a control unit that receives an operation of the operation key and executes a job of handling an image data, wherein the control unit of the electronic device executes a card insertion determination processing of determining whether the detection unit has detected that the card has been inserted into the card accepting device when the operation of the operation key is not received within a preset time after the job is completed, and executes a card insertion notification processing of notifying with the notification unit that the card has been inserted into the card accepting device and a card ejection instruction processing of instructing the card accepting device to eject the card when it is determined that the detection unit has detected that the card has been inserted into the card accepting device.

With such a configuration, the card insertion determination processing is executed when the operation of the operation key is not conducted within a preset time after the job is completed. Where the results of the processing indicate that the card has been inserted into the card accepting device, the card insertion notification processing and card ejection instruction processing are executed.

Therefore, the card insertion notification processing is executed when a state is sustained in which the card is not ejected for a preset time after the user has inserted the card into the card accepting device and the job has been executed by the electronic device. Therefore, the user can easily determine that the card is not ejected at this point in time.

As a result, the user can receive the results of the card insertion notification processing and conduct the operation of ejecting the card with the special operation key. Therefore, the user can be easily prevented from forgetting to eject the card from the card accepting device after the job has been executed by the electronic device.

Further, because the card inserted into the card accepting device can be forcibly ejected, while the card insertion notification processing is being executed, the user can easily determine the state in which the card can be removed and therefore the opportunity for removing the card is adequately ensured.

Furthermore, because the card is ejected when the operation of the operation key is not conducted within a preset time after the job is completed, the factors preventing the electronic device from executing an energy saving mode are removed.

In the above-described configuration, it is preferred that the card accepting device further include a data read output unit that reads data written to the card and outputs the read-out data, and that the control unit of the electronic device execute a usage prohibition data determination processing of determining whether usage prohibition data for prohibiting the use of the electronic device are contained in the data that have been read and outputted from the card accepting device and determining whether the usage prohibition data have been written to the card, and execute a job execution prohibition processing of prohibiting the execution of the job when the control unit determines that the usage prohibition data have been written to the card.

With such a configuration, job execution is prohibited when the usage prohibition data are written to the card inserted into the card accepting device. Therefore, the card can be easily prevented from being used by another person.

In the above-described configuration, it is preferred that the control unit of the electronic device execute a usage prohibition notification processing of notifying with the notification unit that the use of the electronic device is prohibited when executing the job execution prohibition processing.

With such a configuration, the usage prohibition notification processing is executed by the electronic device when another person inserts into the card accepting device a card with the usage prohibition data written thereto. As a result, another person who erroneously inserted the card into the card accepting device can easily determine that the use of the card is prohibited. Therefore, the other person can be easily prevented from erroneously inserting the card into the card accepting device and causing the electronic device to execute the job.

In the above-described configuration, it is preferred that the card accepting device further include a usage prohibition data erasure processing unit that erases the usage prohibition data written to the card under the control with the electronic device, and that the control unit of the electronic device execute a usage prohibition data erasure instruction processing of erasing, with the card accepting device, usage prohibition data for prohibiting the use of the electronic device that have been written to the card.

With such a configuration, the usage prohibition data written to the card are erased by the card accepting device that has been controlled by the electronic device. As a result, even though the card usage is prohibited, the user who reacquired the card can again return the card to the usable state by erasing the usage prohibition data written to the card.

In the above-described configuration, it is preferred that the control unit of the electronic device execute the usage prohibition data erasure instruction processing after executing a recognition data input reception processing of receiving an input of recognition data for erasing the usage prohibition data written to the card and a recognition data verification processing of verifying the inputted recognition data.

With such a configuration, the usage prohibition data erasure instruction processing is executed after the recognition data inputted in the recognition data input receiving processing have been verified by the recognition data verification processing. As a result, only the appropriate card owner can erase the usage prohibition data written to the card. Therefore, the usage prohibition data is effectively prevented from being erased by another person.

In the above-described configuration, it is preferred that the card accepting device further include: a data write processing unit that receives the recognition data from the electronic device and writes the recognition data to the card under the control with the electronic device; and a data read output unit that reads and outputs the recognition data written to the card under the control with the electronic device, and that the control unit of the electronic device executes a recognition data write instruction processing of outputting the recognition data inputted by the operation of the operation key to the card accepting device, thereby writing the recognition data to the card, and cause the card accepting device to output the recognition data written to the card and receive the recognition data as the recognition data input reception processing.

With such a configuration, where the recognition data are inputted by the operation of the operation key in the electronic device, these recognition data are outputted to the card accepting device. The recognition data outputted to the card accepting device are written by the card accepting device to the card inserted into the card accepting device.

The recognition data that are thus written by the card accepting device to the card are read under the control with the electronic device, outputted to the electronic device, and used for the recognition data verification processing in the electronic device.

The recognition data input reception processing and recognition data verification processing are thus specifically realized in the electronic device.

This application is based on Japanese Patent Application Serial No. 2008-312188, filed in Japan Patent Office on Dec. 8, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An electronic device comprising:
a connection unit serving for connection of a card accepting device that outputs a card presence signal indicating that a card is inserted when the card in which user information necessary to use the electronic device is recorded has been inserted and ejects the card by an operation of a special operation key or control with the electronic device, the card accepting device further includes a data write processing unit that writes data to the card;
a detection unit that receives via the connection unit the card presence signal outputted from the card accepting device and detects that the card has been inserted into the card accepting device;
a notification unit that notifies that the card has been inserted into the card accepting device;
an operation key; and
a control unit that receives an operation of the operation key and executes a job of handling an image data, wherein
the control unit executes a card insertion determination processing of determining whether the detection unit has detected that the card has been inserted into the card accepting device when the operation of the operation key is not received within a preset time after the job is completed, executes a card insertion notification processing of notifying with the notification unit that the card has been inserted into the card accepting device and a card ejection instruction processing of instructing the card accepting device to eject the card when it is determined that the detection unit has detected that the card has been inserted into the card accepting device and executes a usage prohibition data write instruction processing of writing usage prohibition data for prohibiting the use of the electronic device to the card with the card accepting device when it is determined based on the results of executing the card insertion determination processing that the detection unit has detected that the card has been inserted into the card accepting device.

2. The electronic device according to claim 1, wherein
the card accepting device that reads data written to the card and outputs the read-out data under the control with the electronic device is connected to the connection unit, and
the control unit executes a usage prohibition data determination processing of determining whether usage prohibition data for prohibiting the use of the electronic device are contained in the data that have been read and outputted from the card accepting device and determining whether the usage prohibition data have been written to the card, and executes a job execution prohibition processing of prohibiting the execution of the job when the control unit determines that the usage prohibition data has been written to the card.

3. The electronic device according to claim 2, wherein
when executing the job execution prohibition processing, the control unit executes a usage prohibition notification processing of notifying with the notification unit that the use of the electronic device is prohibited.

4. The electronic device according to claim 1, wherein
the card accepting device that erases data written to the card under the control with the electronic device is connected to the control unit, and
the control unit executes a usage prohibition data erasure instruction processing of erasing, with the card accepting device, usage prohibition data for prohibiting the use of the electronic device that have been written to the card.

5. The electronic device according to claim 4, wherein
the control unit executes the usage prohibition data erasure instruction processing after executing a recognition data input reception processing of receiving an input of recognition data for erasing the usage prohibition data written to the card and a recognition data verification processing of verifying the inputted recognition data.

6. The electronic device according to claim 5, wherein
the connection unit is connected to the card accepting device that is further provided with a data write processing unit that receives the recognition data from the electronic device and writes the recognition data to the card under the control with the electronic device, and a data read output unit that reads and outputs the recognition data written to the card under the control with the electronic device, and
the control unit
executes a recognition data write instruction processing of outputting the recognition data inputted by the operation of the operation key to the card accepting device, thereby writing the recognition data to the card, and
causes the card accepting device to output the recognition data written to the card and receives the recognition data as the recognition data input reception processing.

7. A card accepting device comprising:
a card presence signal output processing unit that outputs, to an electronic device, a card presence signal indicating that a card is inserted when the card in which user information necessary to use the electronic device is recorded has been inserted;
a card ejection processing unit that ejects the card by an operation of a special operation key or control with the electronic device; and
a usage prohibition data write processing unit that writes usage prohibition data for prohibiting the use of the electronic device to the card under the control with the electronic device.

8. The card accepting device according to claim 7, further comprising a usage prohibition data erasure processing unit that erases the usage prohibition data written to the card under the control with the electronic device.

9. The card accepting device according to claim 7, further comprising:
a data write processing unit that receives a recognition data for erasing a usage prohibition data written to the card from the electronic device and writes the recognition data to the card under the control with the electronic device; and
a data read output unit that reads and outputs the recognition data written to the card under the control with the electronic device.

10. An image handling system comprising:
a card accepting device that outputs a card presence signal indicating that a card is inserted when the card in which user information necessary to use the electronic device is recorded has been inserted and ejects the card by an operation of a special operation key or control with the electronic device, the card accepting device further includes a data write processing unit that writes data to the card; and
an electronic device including:
a connection unit serving for connection of the card accepting device that can insert and eject the card in which user information necessary to use the electronic device is recorded and that outputs a card presence signal indicating that the card has been inserted;
a detection unit that receives via the connection unit the card presence signal outputted from the card accepting device and detects that the card has been inserted into the card accepting device;
a notification unit that notifies that the card has been inserted into the card accepting device;
an operation key; and
a control unit that receives an operation of the operation key and executes a job of handling an image data, wherein
the control unit of the electronic device executes a card insertion determination processing of determining whether the detection unit has detected that the card has been inserted into the card accepting device when the operation of the operation key is not received within a preset time after the job is completed, executes a card insertion notification processing of notifying with the notification unit that the card has been inserted into the card accepting device and a card ejection instruction processing of instructing the card accepting device to eject the card when it is determined that the detection unit has detected that the card has been inserted into the card accepting device and executes a usage prohibition data write instruction processing of writing usage prohibition data for prohibiting the use of the electronic device to the card with the card accepting device when it is determined based on the results of executing the card insertion determination processing that the detection unit has detected that the card has been inserted into the card accepting device.

11. The image handling system according to claim 10, wherein
the card accepting device further includes a data read output unit that read data written to the card and outputs the read-out data, and
the control unit of the electronic device executes a usage prohibition data determination processing of determining whether usage prohibition data for prohibiting the use of the electronic device are contained in the data that have been read and outputted from the card accepting device and determining whether the usage prohibition data have been written to the card, and executes a job execution prohibition processing of prohibiting the execution of the job when the control unit determines that the usage prohibition data have been written to the card.

12. The image handling system according to claim 11, wherein
when executing the job execution prohibition processing, the control unit of the electronic device executes a usage prohibition notification processing of notifying with the notification unit that the use of the electronic device is prohibited.

13. The image handling system according to claim 10, wherein
the card accepting device further includes a usage prohibition data erasure processing unit that erases the usage prohibition data written to the card under the control with the electronic device, and
the control unit of the electronic device executes a usage prohibition data erasure instruction processing of erasing, with the card accepting device, usage prohibition data for prohibiting the use of the electronic device that have been written to the card.

14. The image handling system according to claim 13, wherein
the control unit of the electronic device executes the usage prohibition data erasure instruction processing after executing a recognition data input reception processing of receiving an input of recognition data for erasing the usage prohibition data written to the card and a recognition data verification processing of verifying the inputted recognition data.

15. The image handling system according to claim 14, wherein
the card accepting device further includes:
a data write processing unit that receives the recognition data from the electronic device and writes the recognition data to the card under the control with the electronic device; and
a data read output unit that reads and outputs the recognition data written to the card under the control with the electronic device, and
the control unit of the electronic device
executes a recognition data write instruction processing of outputting the recognition data inputted by the operation of the operation key to the card accepting device, thereby writing the recognition data to the card, and
causes the card accepting device to output the recognition data written to the card and receives the recognition data as the recognition data input reception processing.

* * * * *